US009447884B2

United States Patent
Hosoe et al.

(10) Patent No.: US 9,447,884 B2
(45) Date of Patent: Sep. 20, 2016

(54) SLIDING PARTS

(75) Inventors: Takeshi Hosoe, Tokyo (JP); Hideyuki Inoue, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 27 days.

(21) Appl. No.: 14/236,856

(22) PCT Filed: Aug. 13, 2012

(86) PCT No.: PCT/JP2012/070643
§ 371 (c)(1),
(2), (4) Date: Feb. 3, 2014

(87) PCT Pub. No.: WO2013/031529
PCT Pub. Date: Mar. 7, 2013

(65) Prior Publication Data
US 2014/0159314 A1 Jun. 12, 2014

(30) Foreign Application Priority Data

Sep. 3, 2011 (JP) ................................ 2011-192170

(51) Int. Cl.
*F16J 15/34* (2006.01)
(52) U.S. Cl.
CPC .............. *F16J 15/34* (2013.01); *F16J 15/3412* (2013.01); *F16J 15/3428* (2013.01); *F16J 15/3496* (2013.01); *F16J 15/342* (2013.01)
(58) Field of Classification Search
CPC .... F16J 15/34; F16J 15/3404; F16J 15/3408; F16J 15/3412; F16J 15/3416; F16J 15/342; F16J 15/3442; F16J 15/3428
See application file for complete search history.

(56) References Cited

U.S. PATENT DOCUMENTS 3,945,893 A * 3/1976 Ishimori et al. ............... 205/109
4,765,632 A * 8/1988 D'Alterio ..................... 277/385
(Continued)

FOREIGN PATENT DOCUMENTS

JP 3-43175 4/1991 ............... F16J 15/34
JP 04-293998 10/1992 ........... C10M 111/00
(Continued)

OTHER PUBLICATIONS

First Notification of Reason for Refusal issued in corresponding Chinese Patent Appln. No. 201280034११.6 dated Mar. 17, 2015, and English translation (11 pgs).
(Continued)

*Primary Examiner* — Kristina Fulton
*Assistant Examiner* — Nicholas L Foster
(74) *Attorney, Agent, or Firm* — Hayes-Soloway P.C.

(57) ABSTRACT

A sliding part assembly includes a plurality of circumferentially separated sealed-fluid-accommodating blocks formed on a sealing face of either the stationary ring or the rotating ring so as to communicate with a sealed-fluid-accommodating space. Pumping areas for generating a pumping action due to the stationary and rotating ring sliding in relative rotation are formed on the bottom of the plurality of sealed-fluid-accommodating blocks. The pumping areas formed on the bottom of the plurality of sealed-fluid-accommodating blocks are provided with intake pumping areas operating in a direction so as to draw in the sealed fluid and outflow pumping areas operating in a direction so as to expel the sealed fluid. A seal dam area on the sealing face on which said sealed-fluid-accommodating blocks are formed is formed from a high-lubricity sliding material, the seal dam area being on the opposite side of the sealing face relative to the sealed-fluid side.

19 Claims, 7 Drawing Sheets

(56) References Cited

U.S. PATENT DOCUMENTS

| | | | |
|---|---|---|---|
| 5,462,813 A | 10/1995 | Nagano et al. | 428/698 |
| 5,501,470 A | 3/1996 | Fuse et al. | 277/96.1 |
| 5,529,317 A * | 6/1996 | Muller | 277/400 |
| 5,529,318 A * | 6/1996 | Fuse et al. | 277/400 |
| 5,571,611 A | 11/1996 | Nagano et al. | 428/319.1 |
| 5,998,318 A * | 12/1999 | Takanami et al. | 501/90 |
| 6,189,896 B1 * | 2/2001 | Dickey et al. | 277/608 |
| 6,446,976 B1 * | 9/2002 | Key et al. | 277/367 |
| 8,360,436 B2 | 1/2013 | Teshima et al. | 277/400 |
| 8,381,695 B2 * | 2/2013 | Klink | B23H 9/008 123/193.1 |
| 2004/0080112 A1 * | 4/2004 | Tejima | 277/306 |
| 2004/0146709 A1 * | 7/2004 | Tomoto | 428/355 R |
| 2006/0244221 A1 * | 11/2006 | Villeneuve et al. | 277/410 |
| 2007/0045966 A1 * | 3/2007 | Jiang et al. | 277/404 |
| 2007/0228664 A1 * | 10/2007 | Anand et al. | 277/399 |
| 2007/0275267 A1 * | 11/2007 | Sabouni et al. | 428/698 |
| 2011/0101616 A1 * | 5/2011 | Teshima et al. | 277/358 |
| 2011/0121518 A1 * | 5/2011 | Peng | F16J 15/3404 277/404 |
| 2012/0217705 A1 * | 8/2012 | Hosoe et al. | 277/400 |
| 2013/0209011 A1 * | 8/2013 | Tokunaga | 384/123 |

FOREIGN PATENT DOCUMENTS

| | | | |
|---|---|---|---|
| JP | 6-43423 | 6/1994 | F16J 15/34 |
| JP | 07-035242 | 2/1995 | F16J 15/34 |
| JP | 2009-14183 | 1/2009 | F16C 33/24 |
| JP | 2009-250378 | 10/2009 | F16J 15/34 |
| WO | WO 2007/058177 | 5/2007 | F16J 15/34 |
| WO | WO 2009/087995 | 7/2009 | F16J 15/34 |
| WO | WO 2010/001762 | 1/2010 | F16J 15/34 |

OTHER PUBLICATIONS

International Search Report issued in corresponding PCT Patent Appln. Serial No. PCT/JP2012/070643 dated Sep. 4, 2012, with English translation (4 pgs).

International Preliminary Report on Patentability issued in corresponding application No. PCT/JP2012/070643, dated Mar. 13, 2014 (7 pgs).

* cited by examiner (b)

(a)

SLIDING PARTS

TECHNICAL FIELD

The present invention relates to relatively rotating sliding parts applied to a mechanical seal, and in particular to sliding parts used, for example, in the fields of automotive seals, seals for general industrial machinery, or other seals.

BACKGROUND ART

In sealing device for preventing the leakage of a sealed fluid, where the device comprises two parts configured so as to rotate relatively to one another and so that ends thereof slide on a flat surface, such as, for example, a mechanical seal, a balance must be struck the two opposing conditions of "seal tightness" and "lubrication" in order to maintain seal integrity for extended periods of time. In recent years, environmental concerns in particular have led to an increase in demand for reduced friction in order to reduce mechanical damage while preventing sealed fluid leakage. Friction can be reduced by reaching a "fluid lubrication state" in which dynamic pressure is generated between sealing faces due to rotation, and the surfaces slide with a liquid membrane interposed therebetween. However, in such cases, positive pressure is generated between the sealing faces, so that the fluid flows from the positive pressure area to the outside of the sealing faces. Such fluid outflow constitutes leakage in the case of a seal.

The inventors have already filed a patent application for a sliding member for a mechanical seal for sealing a sealed fluid present on one side in the radial direction of relatively rotationally sealing faces, wherein a plurality of grating portions 50, in which a plurality of parallel rectilinear indentations are formed on the sealing face at a predetermined pitch within a predetermined area, are circumferentially separated in the area between radii R2 and R3 on a sealing face 51 having an internal diameter R1 and an external diameter R4; the rectilinear indentations of the plurality of grating portions being formed so as to incline at a predetermined angle relative to the sliding direction of the sealing face, thereby improving the introduction and retention of the sealed fluid between the sealing faces, and allowing stable and favorable lubricity to be obtained, as shown in FIG. 7 ("the prior art"; cf. patent document 1).

The function of a mechanical seal is to act as a hermetic seal, and the path of the sealed fluid must be completely blocked when stopped in order to prevent leakage. To that end, an inner circumference 52 located on the atmosphere side of the grating portions 50 of the prior art described above is made to function as a seal dam area, preventing leakage while stopped.

The provision of the grating portions 50 in the prior art described above improves the lubricity of the sealing faces in the vicinity of the grating portions 50 from when rotation first starts, but the inner circumference 52 acting as a seal dam area tends to lack sufficient lubricity. The performance of actual testing confirmed that wear of the inner circumference 52 had occurred.

CITATION LIST

Prior Art Document

{Patent Document}

Patent Document 1: Domestic Re-publication of PCT International Application No. WO 2009/087995

SUMMARY OF INVENTION

Technical Problem

The present invention was contrived in order to resolve the problems in the prior art, it being an object thereof to provide sliding parts that do not leak when stopped, operate under fluid lubrication and prevent leakage when rotating, including during initial rotation, and are capable of striking a balance between seal tightness and lubrication.

Solution to Problem

In order to achieve the above object, a first aspect of the sliding parts according to the present invention constitutes sliding parts in which sealing faces of opposed annular stationary and rotating rings are allowed to rotate relative to one another, thereby sealing a sealed fluid present on one side in the radial direction of the sealing faces that slide in the relative rotation, the annular stationary ring being fixed on a fixed side and the annular rotating ring rotating along with a rotating shaft; the sliding parts being characterized in that:

a plurality of circumferentially separated sealed-fluid-accommodating blocks are formed on the sealing face of either the stationary ring or the rotating ring so as to communicate with a sealed-fluid-accommodating space;

pumping areas for generating a pumping action due to the stationary and rotating ring sliding in relative rotation are formed on the bottom of the plurality of sealed-fluid-accommodating blocks;

the pumping areas formed on the bottom of the plurality of sealed-fluid-accommodating blocks are provided with intake pumping areas operating in a direction so as to draw in the sealed fluid and outflow pumping areas operating in a direction so as to expel the sealed fluid; and a seal dam area on the sealing face on which said sealed-fluid-accommodating blocks are formed is formed from a high-lubricity sliding material, the seal dam area being on the opposite side of the sealing face relative to the sealed-fluid side.

A second aspect of the sliding parts according to the present invention is the sliding parts according to the first aspect, characterized in that the sealed-fluid-accommodating blocks, pumping areas, and seal dam area formed from the high-lubricity sliding material are formed as stationary rings made of a soft material.

A third aspect of the sliding parts according to the present invention is the sliding parts according to the first aspect, characterized in that the sealed-fluid-accommodating blocks, pumping areas, and seal dam area formed from the high-lubricity sliding material are formed as rotating rings made of a hard material.

A fourth aspect of the sliding parts according to the present invention is the sliding parts according to one of the first through the third aspects, characterized in that the seal dam area formed from the high-lubricity sliding material is formed integrally with the stationary ring or the rotating ring.

A fifth aspect of the sliding parts according to the present invention is the sliding parts according to one of the first through the third aspects, characterized in that the seal dam area formed from the high-lubricity sliding material is formed separately from the stationary ring or the rotating ring, and is integrated therewith by bonding.

A sixth aspect of the sliding parts according to the present invention is the sliding parts according to one of the first through the fifth aspects, characterized in that the high-lubricity sliding material is a material containing one solid lubricant out of PTFE, $MoS_2$, $WS_2$, graphite, BN, or the like.

A seventh aspect of the sliding parts according to the present invention is the sliding parts according to one of the first through the fifth aspects, wherein the high-lubricity sliding material is a material containing a lubricative oil.

Advantageous Effects of Invention

The present invention yields the following superior effects.

(1) Owing to the characteristics of the first through the third aspects described above, the sealing faces of the stationary ring and the rotating ring are in a state of solid contact when stopped, so that the circumferentially continuous sealing faces, particularly the seal dam area, prevent leakage, thereby maintaining seal integrity; and, upon activation, the sealed fluid is taken into the spaces within the sealed-fluid-accommodating blocks, making it possible to quickly form a lubricating fluid film, and, coupled with the fact that the seal dam area is formed from a high-lubricity sliding material, to reduce the sliding torque of the sealing faces and lessen wear. Furthermore, during operation, the sealed fluid is drawn into the sealed-fluid-accommodating block provided with the intake pumping areas, sent to the sealed-fluid-accommodating blocks provided with the outflow pumping areas located at a separate position with the sealing faces interposed therebetween, and returned from the sealed-fluid-accommodating blocks to the sealed fluid side through the action of the outflow pumping areas, thereby ensuring the lubricity of the sealing face, preventing leakage, and preserving seal integrity.

Furthermore, the fact that the seal dam area is formed from a high-lubricity sliding material reduces wearing of the seal dam area, allowing seal functionality to be maintained over extended periods of time.

(2) Owing to the characteristics of the fourth and fifth aspects described above, the seal dam area formed from the high-lubricity sliding material can easily and reliably be formed on the stationary ring or the rotating ring.

(3) Owing to the characteristics of the sixth and seventh aspects described above, the seal dam area can be imparted with noticeably high lubricity, and wearing of the seal dam area can be further reduced.

DESCRIPTION OF EMBODIMENTS

An embodiment of the sliding parts according to the present invention will be described in detail with reference to the drawings.

In the present embodiment, the parts constituting the mechanical seal are sliding parts, for example, but this should not be construed as being by way of limitation to the present invention; various alterations, modifications, and improvements may be added according to the knowledge of a person skilled in the art within the scope of the present invention.

Figure 1:
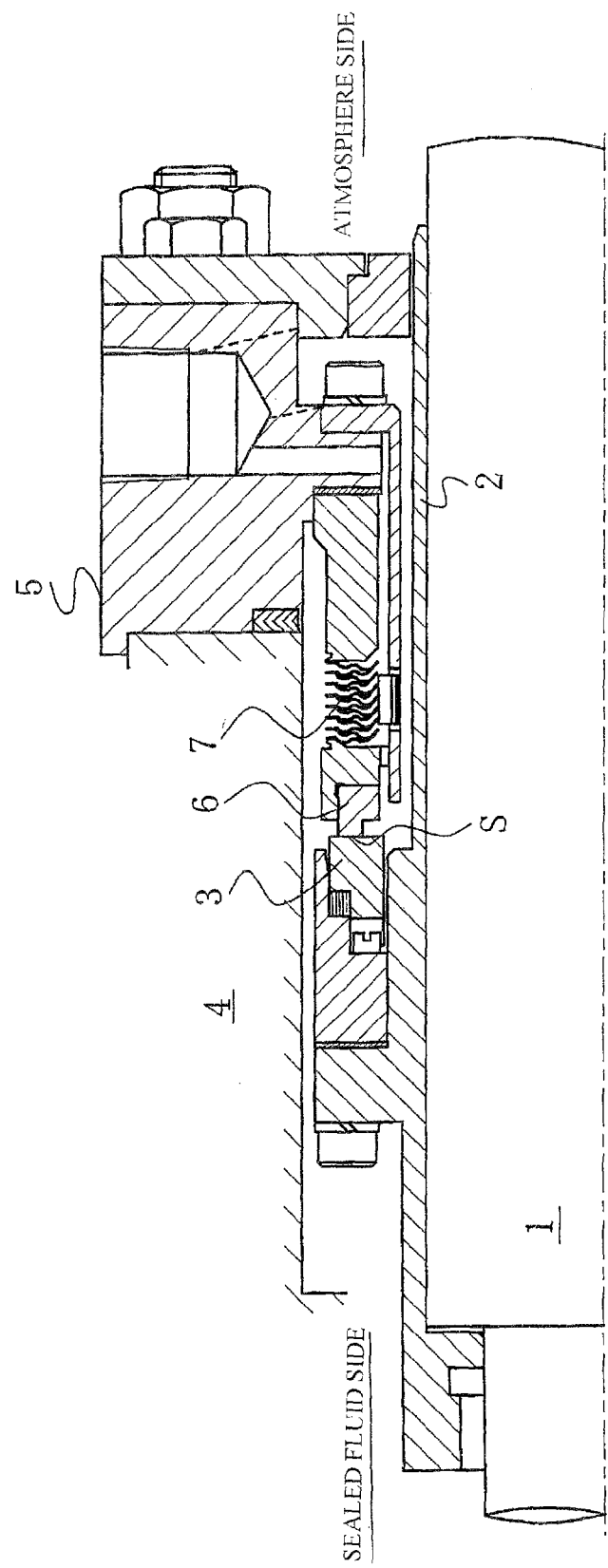
FIG. 1 is a front cross-sectional view of an example of a mechanical seal for general industrial machinery.

FIG. 1 is a front cross-sectional view of an example of a mechanical seal for general industrial machinery.

The mechanical seal shown in FIG. 1 is an inside-type seal for sealing a sealed fluid attempting to leak from the outer circumference of a sealing face in the inner circumference direction, in which an annular rotating ring 3 rotatably provided integrally with a rotating shaft 1 for driving a sealed fluid-side pump impeller (not shown), a sleeve 2 being interposed between the rotating shaft 1 and the rotating ring 3, and an annular stationary ring 6 non-rotatably but movably provided in the axial direction with respect to a seal cover 5 fixed to a pump housing 4 are configured so that sealing faces S imparted with a mirrored finish via lapping or another process slide in close contact due to a bellows 7 urging the stationary ring 6 in the axial direction. In other words, in this mechanical seal, the sealed fluid is prevented from flowing from the outer circumference of the rotating shaft 1 out to the atmosphere side at the sealing faces S of the rotating ring 3 and the stationary ring 6.

The rotating ring 3 and stationary ring 6 are typically both formed from SiC (a hard material), or from a combination of SiC (a hard material) and carbon (a soft material), but a sliding material used in mechanical seals can be applied as the sliding material. The SiC can be a sintered piece in which boron, aluminum, carbon, or the like is used as a sintering aid, or another material having two or more types of phases of differing components or composition, such as SiC containing dispersed graphite particles, reaction-sintered SiC of SiC and Si, SiC—TiC, SiC—TiN, and the like. The carbon can be carbon containing a mixture of carbon and graphite, or resin-molded carbon, sintered carbon, or the like. Apart from the abovementioned sliding materials, a metal material, resin material, surface-modified material (coating material), composite material, or the like can also be used.

Figure 2:
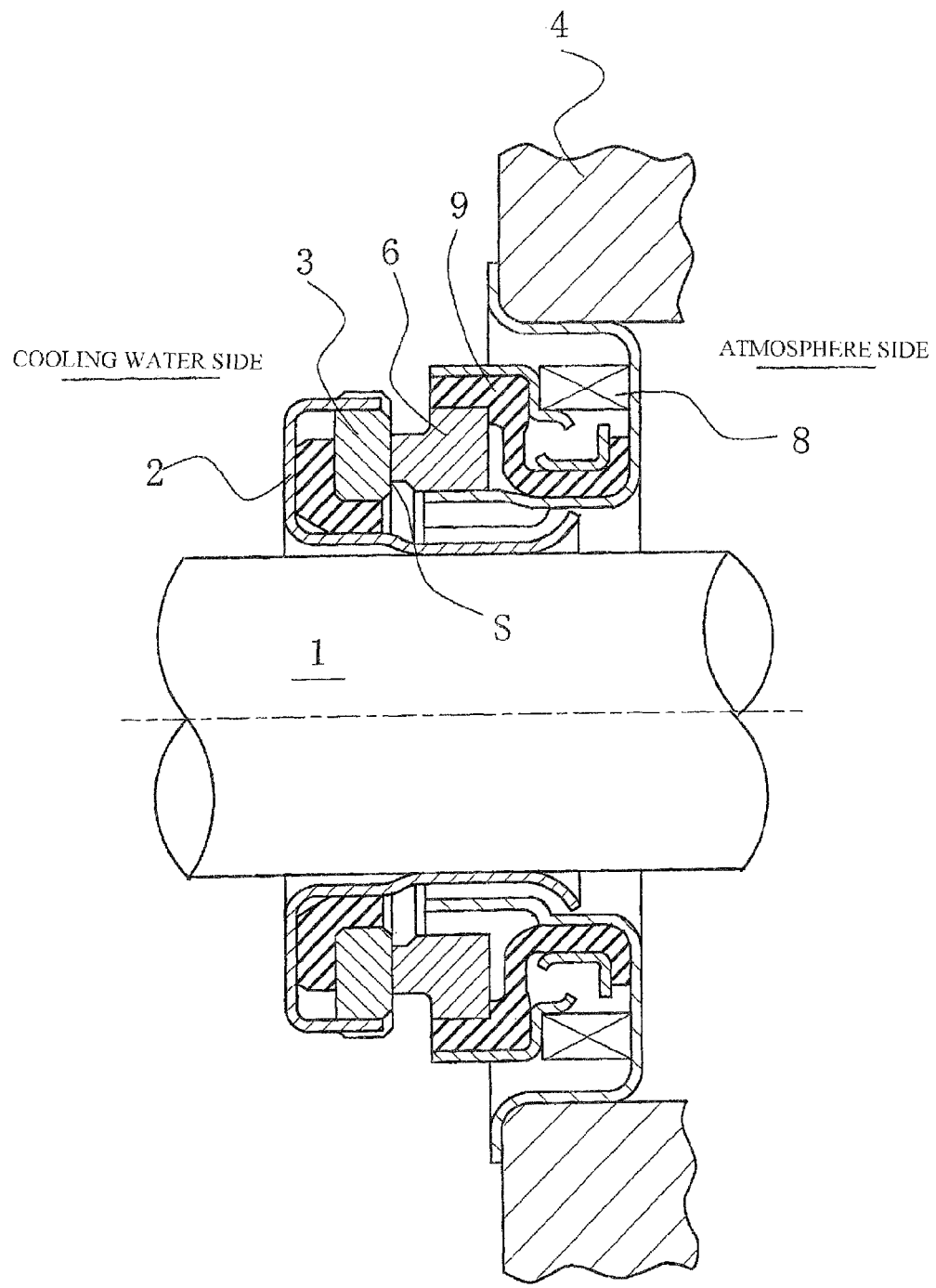
FIG. 2 is a front cross-sectional view of an example of a mechanical seal for a water pump.

FIG. 2 is a front cross-sectional view of an example of a mechanical seal for a water pump.

The mechanical seal shown in FIG. 2 is an inside-type seal for sealing cooling water attempting to leak from the outer circumference of a sealing face in the inner circumference direction, in which an annular rotating ring 3 rotatably provided integrally with a rotating shaft 1 for driving a cooling water-side pump impeller (not shown), a sleeve 2 being interposed between the rotating shaft 1 and the rotating ring 3, and an annular stationary ring 6 non-rotatably but movably provided with respect to the axial direction on a pump housing 4 are configured so that sealing faces S imparted with a mirrored finish via lapping or another process slide in close contact thanks to a coiled wave spring 8 and a bellows 9 urging the stationary ring 6 in the axial direction. In other words, in this mechanical seal, the cooling water is prevented from flowing from the outer circumference of the rotating shaft 1 out to the atmosphere side at the sealing faces S of the rotating ring 3 and the stationary ring 6.

Embodiment 1

Figure 3:
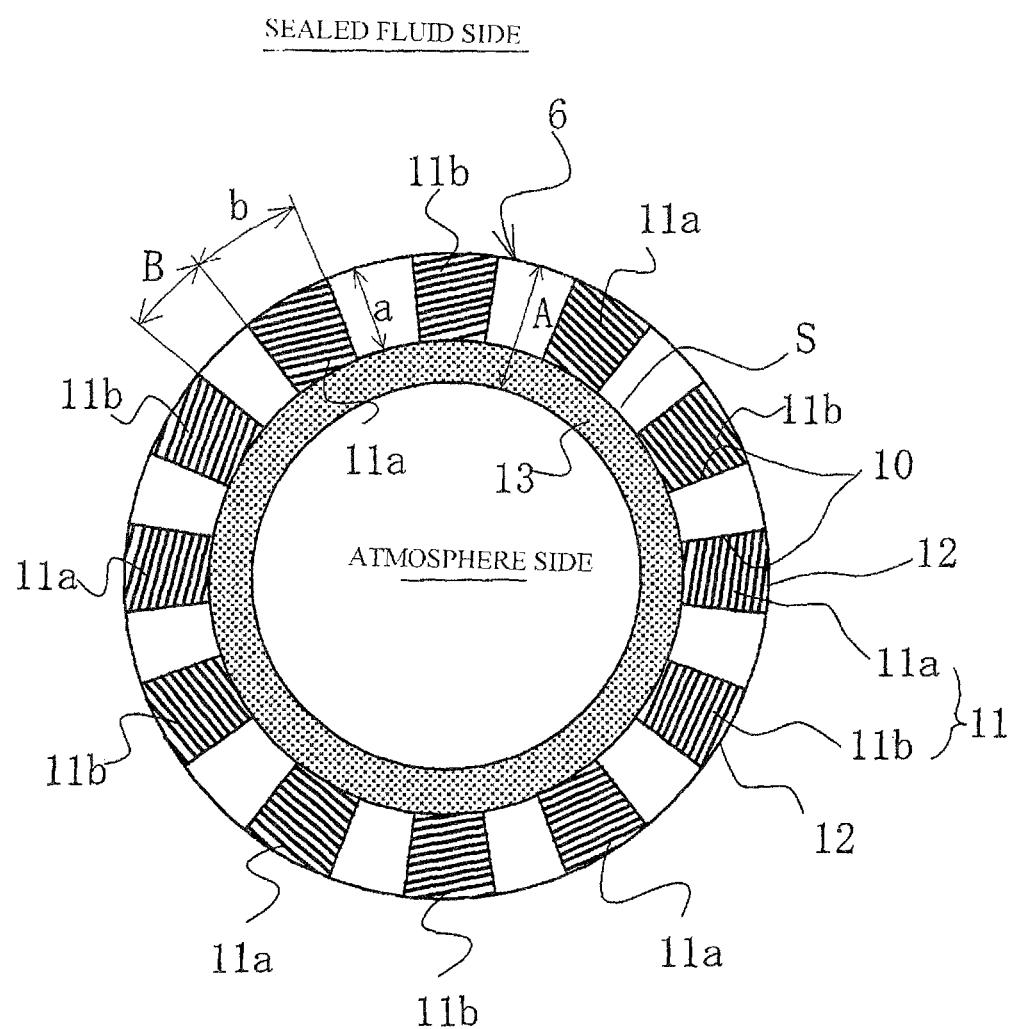
FIG. 3 is a plan view of one embodiment of the mechanical seal shown in FIGS. 1 and 2 in which sealed-fluid-accommodating blocks, pumping areas, and a high-lubricity seal dam area are formed on the sealing face of the stationary ring, which, of the sealing faces of the stationary ring and the rotating ring, has the smaller width in the radial direction.

FIG. 3 is a plan view of one embodiment of the mechanical seal shown in FIGS. 1 and 2 in which sealed-fluid-accommodating blocks, pumping areas, and a high-lubricity seal dam area are formed on the sealing face S of the stationary ring 6, which, of the sealing faces of the stationary ring 6 and the rotating ring 3, has the smaller width in the radial direction.

In FIG. 3, the stationary ring 6 is referred to as a seal ring, and is often formed from carbon (a soft material). A plurality of circumferentially separated sealed-fluid-accommodating blocks 10 are formed on the sealing face S of the stationary ring 6 so as to be a part of the radial direction of the sealing face S and directly communicate with the sealed fluid-accommodating space via an outer circumference side 12.

In the case of an outside-type mechanical seal in which the sealed fluid side is to the inside of the rotating ring 3 and the stationary ring 6, the sealed-fluid-accommodating blocks 10 need only be formed as part of the sealing face S in the radial direction and directly communicate with the sealed fluid-accommodating space via the inner circumference side.

The width a in the radial direction of the sealed-fluid-accommodating blocks 10 is roughly one- to two-thirds of the width A in the radial direction of the sealing face S, and the angular range b of the sealed-fluid-accommodating blocks 10 in the circumferential direction is set to be equal to or somewhat larger than the angular range B of the sealing face between adjacent sealed-fluid-accommodating blocks 10, 10.

In order to reduce friction upon the mechanical seal, a liquid membrane approximately 0.1 µm to 10 µm thick is normally necessary, depending on the type, temperature, and other attributes of the sealed fluid. In order to obtain such a liquid membrane, a plurality of circumferentially discrete sealed-fluid-accommodating blocks 10 are disposed on the sealing faces S, as described above, and pumping areas 11 for generating a pumping action through the relative rotational sliding of the stationary ring 6 and the rotating ring 3 are formed on the bottom of the plurality of sealed-fluid-accommodating blocks 10. The pumping areas 11 are provided with intake pumping areas 11a operating in a direction so as to draw in the sealed fluid and outflow pumping areas 11b operating in a direction so as to expel the sealed fluid.

As shown in detail in FIG. 5, described below, a plurality of parallel linear indentations (also referred to as a "periodic linear indentation structure" in the present invention) is formed at a constant pitch in each of the pumping areas 11, the periodic linear indentation structure being a fine structure formed using, for example, a femtosecond laser.

In the present invention, the "linear indentations" encompass not only rectilinear indentations, but also somewhat curved indentations appearing during the process of forming rectilinear indentations, as well as curvilinear indentations.

The inner circumference side on the opposite side from the sealed fluid side of the sealing face on which the sealed-fluid-accommodating blocks 10 are formed must function as a seal dam area for preventing leakage when stopped. Because a seal dam area 13 for performing this seal dam area function is not fully covered by the sealed fluid (lubricating fluid), it is liable to be poorly lubricated and undergo wearing. In order to prevent wearing of the seal dam area 13 and reduce sliding friction, the seal dam area 13 is formed from a high-lubricity sliding material in the present invention.

Figure 4:
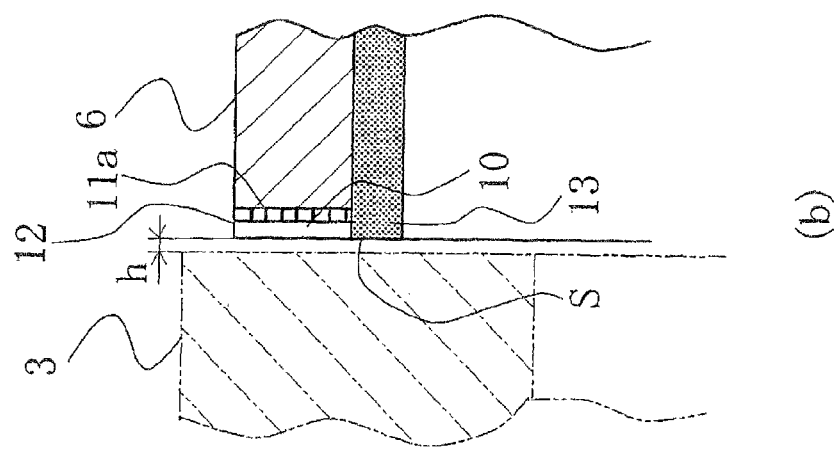
FIG. 4 shows the sealed-fluid-accommodating blocks, pumping areas, and high-lubricity seal dam area of FIG. 3 in operation, with 4(a) being a magnified plan view of the main parts, and 4(b) being a cross-sectional view along line X-X in 4(a).
Figure 4:
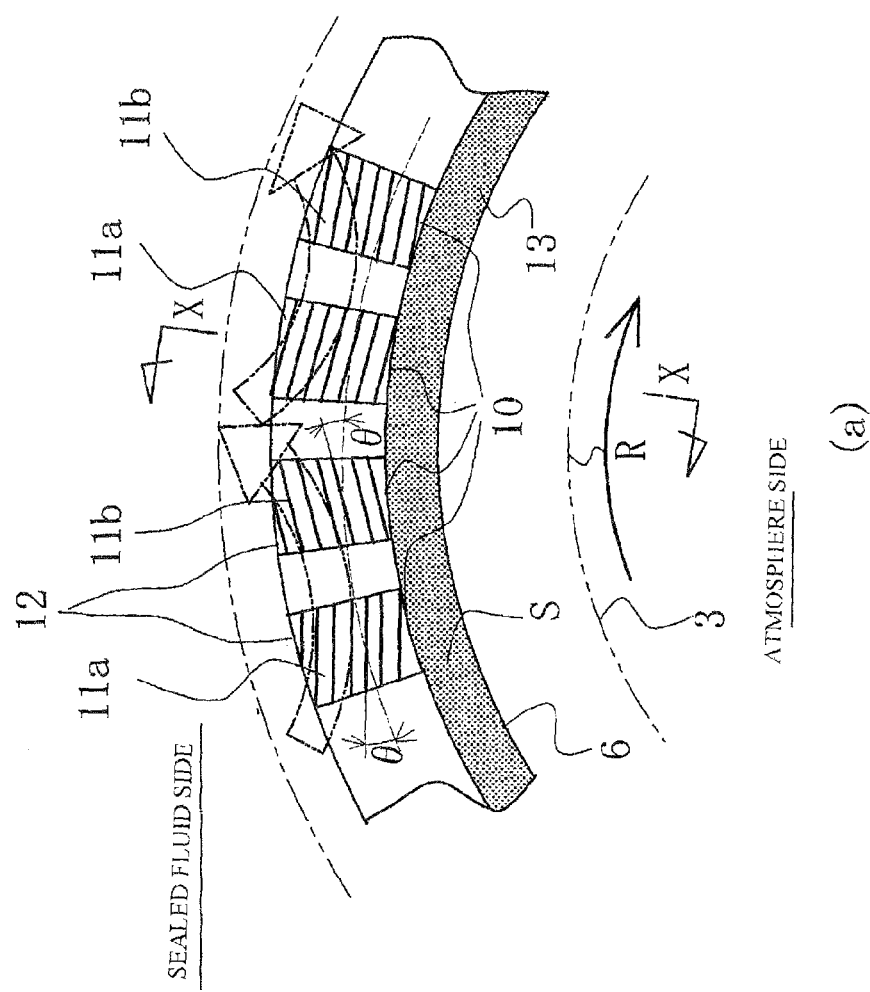

FIG. 4 shows the sealed-fluid-accommodating blocks, pumping areas, and high-lubricity seal dam area of FIG. 3 in operation, with 4(a) being a magnified plan view of the main parts, and 4(b) being a cross-sectional view along line X-X in 4(a).

In FIG. 4, the stationary ring 6 is represented by a solid line, and the rotating ring 3 acting as the counterpart sliding member is represented by a double-dashed line, the rotating ring 3 rotating in direction R.

As shown in FIG. 4(a), the plurality of sealed-fluid-accommodating blocks 10 are separated from circumferentially adjacent sealed-fluid-accommodating blocks 10 by the sealing face S, and are also kept from communicating with the atmosphere side by the sealing face S. As shown in FIG. 4(b), the sealed-fluid-accommodating blocks 10 are formed on a radial part of the sealing face S, describe an indented shape so as to be capable of accommodating the sealed fluid, form a step with the sealing face S, and directly communicate with the sealed fluid-accommodating space via the outer circumference side 12. Therefore, since the sealing faces of the stationary ring 6 and the rotating ring 3 are in solid contact when stopped, seal integrity is maintained by the circumferentially continuous sealing face, and, upon activation, the sealed fluid is drawn into the sealed-fluid-accommodating blocks 10, as shown by the double-dashed arrows in FIG. 4(a).

In addition, as shown in FIG. 4(a), the linear indentations formed in the pumping areas 11 are formed so as to be inclined at a predetermined angle $\theta$ with respect to the sliding direction of the sealing faces S; i.e., with the direction of the tangent line of the rotation of the sealing faces S. The predetermined angle $\theta$ is preferably from 10° to 80° with respect to the tangent line of the rotation of the sealing face S in both the inner circumference direction and the outer circumference direction of the sealing face S.

The angle of inclination $\theta$ of the linear indentations of the pumping areas 11 in each of the plurality of sealed-fluid-accommodating blocks 10 with respect to the tangent line of rotation may be the same for all pumping areas 11, or may differ for each pumping area 11. However, because the sliding properties of the sealing faces S are affected by the angle of inclination $\theta$, imparting the linear indentations of all of the pumping areas 11 with an appropriate specific angle of inclination $\theta$ according to the desired lubricity and sliding conditions is effective in order to obtain stable sliding properties.

Thus, if the sealing faces S rotatingly slide in one direction, the angle of inclination $\theta$ of the linear indentations of the plurality of pumping areas 11 with respect to the tangent line of rotation will be defined as a specific optimal angle.

If the sealing faces S rotatingly slide in both the forward and the reverse directions, desirably co-present are first pumping areas having linear indentations inclining at a first angle with respect to the tangent line of rotation yielding suitable sliding properties during rotation in one direction and second pumping areas having linear indentations inclining at a second angle with respect to the tangent line of rotation yielding suitable sliding properties during rotation in the opposite direction. Such a configuration allows suitable sliding properties to be obtained when the sealing faces S rotate in the forward and reverse directions.

More specifically, if the sealing faces S rotate in both the forward and reverse directions, the angle of inclination S of the linear indentations of the intake pumping areas 11a and outflow pumping areas 11b are preferably formed so as to be symmetrical with respect to the tangent line of rotation.

The intake pumping areas 11a and outflow pumping areas 11b are preferably formed so as to be alternatingly disposed along the circumferential direction of the sealing faces S.

The sealing faces S shown in FIGS. 3 and 4 have a preferable configuration for cases in which the sealing faces S rotate in both directions.

The intake pumping areas 11a and outflow pumping areas 11b need not be alternatingly disposed along the sealing faces S in the circumferential direction; rather, for example, two intake pumping areas 11a may be disposed for every outflow pumping area 11b, and the reverse ratio is also acceptable.

The pumping areas 11, which are structures (periodic structures) in which a plurality of linear indentations that are provided in parallel at a fixed pitch are disposed with high precision, are strictly divided, for example, by using a femtosecond laser within a predetermined area of the sealing face S, then precisely controlling the laser and forming in the direction of the linear indentations in each division.

If a substrate is irradiated using a linearly polarized laser at an irradiation intensity near a machining threshold value, the interference of the incident light and scattered light or plasma waves along the surface of the substrate will result in an indented periodic structure having a wavelength-order pitch and groove depth being automatically formed orthogonally with respect to the polarization direction. Here, the femtosecond laser may be operated while being made to overlap, thereby allowing a periodic linear indentation structure pattern to be formed on the surface.

In a periodic linear indentation structure formed using a femtosecond laser in this way, the directionality thereof can be controlled, as well as the machining position, allowing a desired periodic linear indentation structure to be formed within each of discrete small divisions. Specifically, if the sealing face of an annular mechanical seal sliding member is rotating while this method is used, a fine periodic pattern can be selectively formed on the sealing face. In addition, using a machining method involving a femtosecond laser allows for the formation of linear indentations of sub-micron order depth, which are effective in improving the lubricity and reducing the leakage of the mechanical seal.

The sealed-fluid-accommodating blocks 10 and periodic linear indentation structure are not limited to being formed using a femtosecond laser; a picosecond laser or electron beam may also be used. The sealed-fluid-accommodating blocks 10 and periodic linear indentation structure may also be formed by performing stamping or imprinting using a mold provided with a periodic linear indentation structure while the sealing face of the annular mechanical seal sliding member is being rotated.

The sealed-fluid-accommodating blocks 10 may also be formed by performing etching, then forming a periodic linear indentation structure in the bottom of the sealed-fluid-accommodating blocks using a femtosecond laser or the like. The sealed-fluid-accommodating blocks 10 may also be formed by forming only a periodic linear indentation structure on the sealing face using a femtosecond laser or the like, then plating or forming a film on the sealing face where the periodic linear indentation structure is not formed.

The seal dam area 13 constitutes a part of, and is flush with, the sealing face S; the sealing face S on the inner circumferential side of the area in which the plurality of sealed-fluid-accommodating blocks 10 is formed being the seal dam area 13. One method of forming the seal dam area 13 from a high-lubricity material involves, during the step of molding the stationary ring 6, using a hard material to form the outer circumference side in the radial direction constituting the area where the sealed-fluid-accommodating blocks 10 are to be formed, forming the inner circumference side including the seal dam area 13 from a high-lubricity material, bringing the two members into contact, and firing and molding the members.

Another method of forming the high-lubricity seal dam area 13 is using an adhesive to bond a ring-shaped member made of a high-lubricity sliding material to that part of the stationary ring 6 having a hard material substrate that will constitute the seal dam area 13. Instead of being bonded, the member may also be integrated therewith by welding, fitting together, or joining.

Still another method of forming the high-lubricity seal dam area 13 is modifying the surface of the part that will constitute the seal dam area 13 with a high-lubricity material. Other methods include forming a coating over the part that will constitute the seal dam area 13 by sputtering or coating, blast-embedding a lubricative substance, or utilizing rubbing-assisted transferring. Another method is to mold the entire stationary ring 6 from a soft solid lubricative material, then harden only the parts corresponding to the sealed-fluid-accommodating blocks 10. Hardening methods include firing at high temperature, curing using a reactive material, hardening using a sputter coating, bonding a hard material, and fitting together.

The high-lubricity sliding material is preferably a material containing one solid lubricant out of PTFE, $MOS_2$, $WS_2$, graphite, BN, or the like. In particular, a material containing graphite on a SiC or carbon substrate is preferable.

The high-lubricity sliding material may also be a material containing a lubricative oil. A material containing a fluoride oil is particularly preferable.

Figure 5:
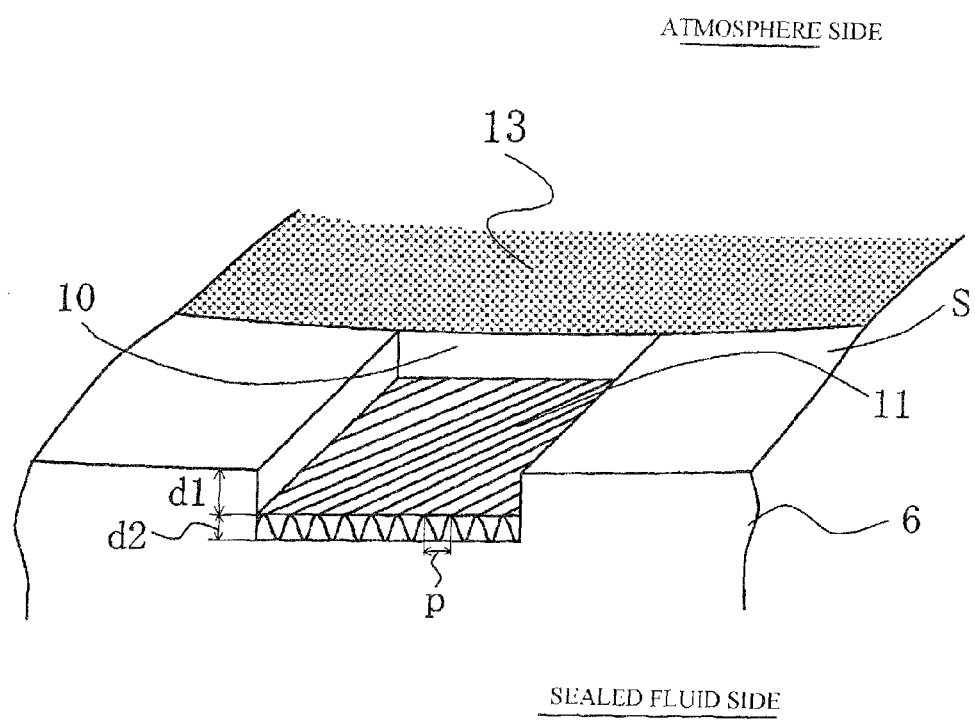
FIG. 5 is a perspective view of a sealed-fluid-accommodating block, pumping area, and high-lubricity seal dam area from FIGS. 3 and 4 from the sealed fluid side.

FIG. 5 is a perspective view of the sealed-fluid-accommodating block, pumping area, and high-lubricity seal dam area from FIGS. 3 and 4 from the sealed fluid side.

As shown in FIG. 4(b), a liquid membrane h from 0.1 μm to 10 μm is formed between the sealing faces of the stationary ring 6 and the rotating ring 3 from initial rotation throughout operation; here, an imaginary plane connecting the apexes of the irregular portions of the pumping areas 11 is set lower than the sealing face S by d1=0.1 h to 10 h according to the liquid membrane h, and the imaginary plane forms a level difference d1 with the sealing face S. The sealed fluid is taken into the space in the sealed-fluid-accommodating blocks 10 formed by the level difference d1, forming a sufficient liquid membrane. However, pressure differences may lead to leakage if only a sufficient liquid membrane is formed. For this reason, the pumping areas 11, which generate a liquid flow so that the sealed fluid does not leak to the atmosphere side, are formed on the bottom of the sealed-fluid-accommodating blocks 10.

If using a femtosecond laser, the sealed-fluid-accommodating blocks 10 are formed first, followed by the pumping areas 11.

The depth d2 between the apexes and troughs of the linear indentations is preferably in the range d2=0.1 h to 10 h.

The pitch p of the linear indentations of the pumping areas 11 is set according to the viscosity of the sealed fluid, but is preferably 0.1 μm to 100 μm. If the sealed fluid has a high viscosity, the pitch p should be increased so that sufficient fluid can enter the grooves.

A seal dam area 13 formed from a high-lubricity sliding material is formed around the entirety of the inner circumference (atmosphere) side of the area in which the sealed-fluid-accommodating blocks 10 are provided on the outer circumference of the sealing face S so as to directly communicate with the sealed fluid. For this reason, leakage when stopped can be prevented in the seal dam area 13 because of the sealing faces S of the stationary ring 6 and the rotating ring 3 in particular being in solid contact; and wearing during rotation can be reduced because of the seal dam area 13 being made of a high-lubricity sliding material.

In FIG. 5, the pumping areas 11 are formed parallel to a plane orthogonal to the axis in the circumferential direction and radial direction, but the pumping areas 11 are optionally inclined in the circumferential direction and/or radial direction as necessary. For example, if the pumping areas 11 are formed as shown in FIG. 3, it is conceivable for the intake pumping areas 11a to be formed so as to gradually decrease in height towards the interior along the radial direction, allowing the sealed fluid to be drawn in more easily, and the outflow pumping areas 11b to be formed so as to gradually increase in height towards the interior along the radial direction, allowing the sealed fluid to be expelled more easily.

As described above, the sealing faces of the stationary ring 6 and the rotating ring 3 are in a state of solid contact when stopped, so that the sealing faces S extending continuously in the circumferential direction, particularly the seal dam area 13, prevent leakage, thereby maintaining seal integrity; and, upon activation, a lubricating fluid film can quickly be formed by the sealed fluid being drawn into the spaces within the sealed-fluid-accommodating blocks 10, combined with the fact that the seal dam area 13 is formed from a high-lubricity sliding material to lower the sliding torque of the sealing faces S and reduce wearing. Furthermore, during operation, the sealed fluid is drawn into the sealed-fluid-accommodating blocks 10 provided with the intake pumping areas 11a, sent to the sealed-fluid-accommodating blocks 10 provided with the outflow pumping areas 11b located at a separate position with the sealing faces S interposed therebetween, and returned from the sealed-fluid-accommodating blocks 10 to the sealed fluid side through the action of the outflow pumping areas 11b (cf. the double-dashed arrows in FIG. 4(a)). This sealed fluid flow allows the lubricity of the sealing faces S to be ensured, leakage to be prevented, and seal integrity to be preserved. In addition, because the imaginary plane connecting the apexes of the linear indentations of the pumping areas 11 is set lower than the sealing face S, and the imaginary plane forms a level difference d1 with the sealing face S, a lubricating fluid membrane can quickly be formed by taking the sealed fluid into the space formed by the level difference d1 upon activation.

Furthermore, the fact that the seal dam area 13 is formed from a high-lubricity sliding material reduces wearing of the seal dam area 13, allowing seal functionality to be maintained over extended periods of time.

Embodiment 2

Figure 6:
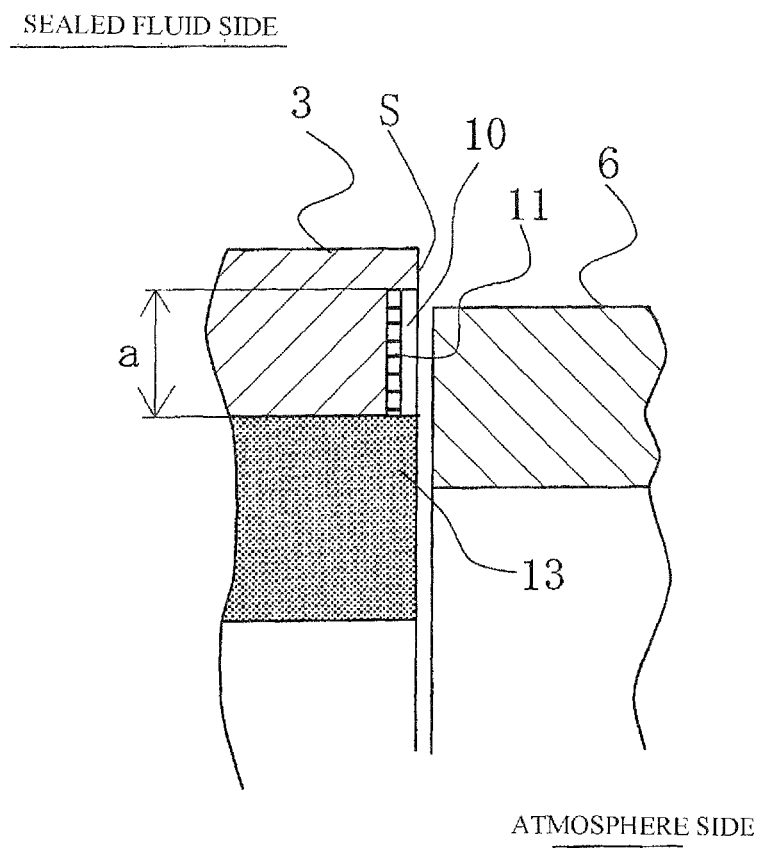
FIG. 6 is a cross-sectional view along a plane orthogonal to the sealing faces of one embodiment of the mechanical seal shown in FIGS. 1 and 2, in which a sealed-fluid-accommodating block, pumping area, and a high-lubricity seal dam area are formed on the sealing face of the rotating ring, which, of the sealing faces of the stationary ring and the rotating ring, has the larger width in the radial direction.
Figure 7:
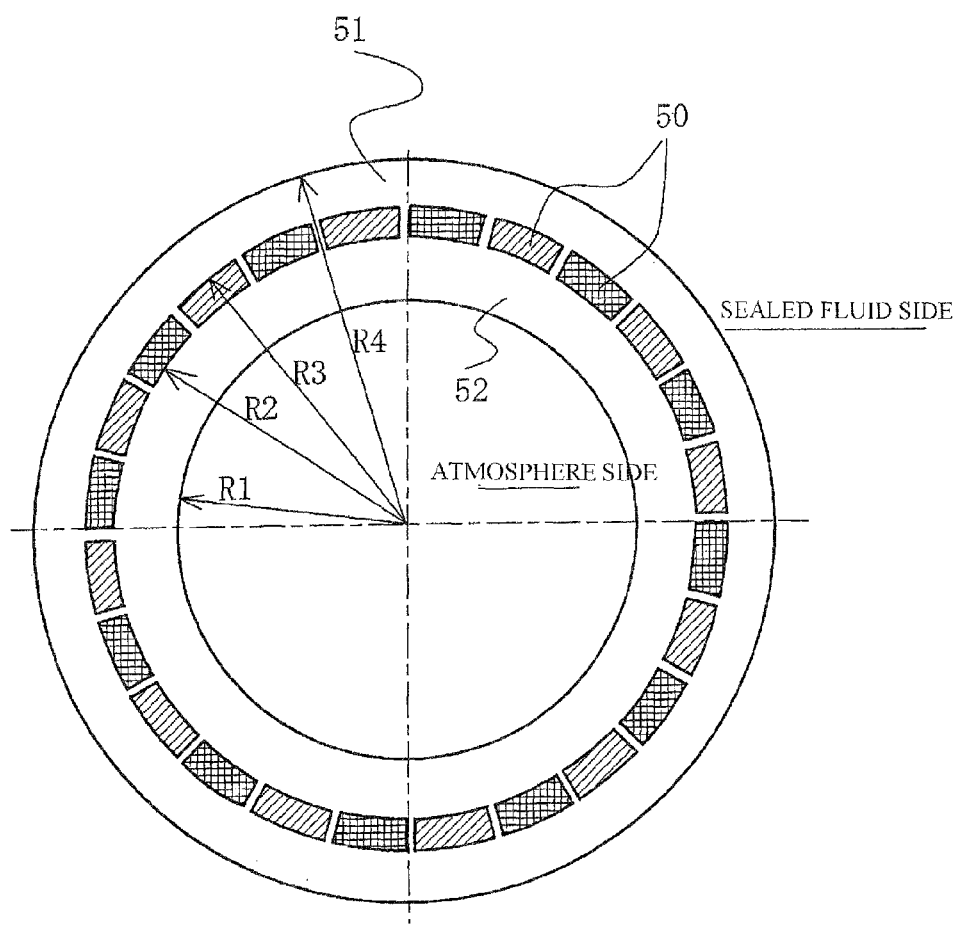
FIG. 7 is a plan view of the prior art.

FIG. 6 is a cross-sectional view along a plane orthogonal to the sealing faces of one embodiment of the mechanical seal shown in FIGS. 1 and 2 in which sealed-fluid-accommodating blocks, pumping areas, and high-lubricity seal dam areas are formed on the sealing face of the rotating ring, which has the larger width in the radial direction of the sealing faces of the stationary ring and the rotating ring.

In FIG. 6, the rotating ring 3 is referred to as a mating ring, and is often formed from SIC (a hard material). A plurality of circumferentially separated sealed-fluid-accommodating blocks 10 are formed on the sealing face S of the rotating ring 3. The plurality of sealed-fluid-accommodating blocks 10 are formed over a part of the outer and inner parts in the radial direction of the sealing face S, and are formed so that a part of the sealed fluid in the sealed-fluid-accommodating blocks 10 is not covered by the corresponding sealing face S of the stationary ring 6. Seal integrity while stopped is thus maintained, and sealed fluid is taken into the sealed-fluid-accommodating blocks 10 upon activation.

The seal dam area 13 formed from a high-lubricity sliding material is formed on the inner circumference (atmosphere) side of the area of the sealing face S of the rotating ring 3 in which the sealed-fluid-accommodating blocks 10 are formed. Here, the entire portion on the inner circumference side of the area of the sealed-fluid-accommodating blocks 10 of the sealing face S of the rotating ring 3 may be formed from a high-lubricity sliding material, but, in this example, only the parts sliding with the stationary ring 6 are formed from a high-lubricity sliding material.

In the case of an outside-type mechanical seal in which the sealed fluid side is to the inside of the rotating ring 3 and the stationary ring 6, an arrangement such that part of the interior of the radial direction of the sealed-fluid-accommodating blocks 10 is not covered by the corresponding sealing face of the stationary ring 6 is sufficient.

REFERENCE SIGNS LIST 1 rotating shaft
2 sleeve
3 rotating ring
4 housing
5 seal cover
6 stationary ring
7 bellows
8 coiled wave spring
9 bellows
10 sealed-fluid-accommodating block
11 pumping area
11a intake pumping area
11b outflow pumping area
12 outer circumference
13 seal dam area formed from a high-lubricity sliding material
S sealing face

The invention claimed is:

1. A sliding part assembly comprising an opposed annular stationary ring and a rotating ring having sealing faces arranged to rotate relative to one another, thereby sealing a sealed fluid present on one side in a radial direction of said sealing faces that slide in said relative rotation, the annular stationary ring being fixed on a fixed side and the annular rotating ring rotating along with a rotating shaft; said sliding parts assembly comprising, in combination:

a plurality of circumferentially separated sealed-fluid-accommodating blocks formed on the sealing face of either said stationary ring or said rotating ring so as to communicate with a sealed-fluid-accommodating space;

pumping areas for generating a pumping action due to the stationary and rotating ring sliding in relative rotation formed on a bottom of said plurality of sealed-fluid-accommodating blocks;

a plurality of linear indentations formed in each of the pumping areas;

wherein the pumping areas formed on the bottom of said plurality of sealed-fluid-accommodating blocks are provided with intake pumping areas operating in a direction so as to draw in the sealed fluid and outflow pumping areas operating in a direction so as to expel the sealed fluid;

apexes of the linear indentation of the pumping areas are set lower than the sealing face on which said sealed-fluid-accommodating blocks are formed; and a sealed-fluid side area of the sealing face on which said sealed-fluid-accommodating blocks are formed is formed from a hard material, a seal dam area of the sealing face being on an opposite side of the sealed-fluid side is formed from a high-lubricity sliding material different from the hard material.

2. The sliding part assembly according to claim 1, wherein said sealed-fluid-accommodating blocks, pumping areas, and seal dam area formed from the high-lubricity sliding material are formed as stationary rings made of a soft material.

3. The sliding part assembly according to claim 1, wherein said sealed-fluid-accommodating blocks, pumping areas, and seal dam area formed from the high-lubricity sliding material are formed as rotating rings made of a hard material.

4. The sliding part assembly according to claim 1, wherein the seal dam area formed from said high-lubricity sliding material is formed integrally with said stationary ring or said rotating ring.

5. The sliding part assembly according to claim 1, wherein the seal dam area formed from said high-lubricity sliding material is formed separately from said stationary ring or said rotating ring, and is integrated therewith by bonding.

6. The sliding part assembly according to claim 1, wherein said high-lubricity sliding material is a material containing a solid lubricant selected from the group consisting of PTFE, MoS2, WS2, graphite and BN.

7. The sliding part assembly according to claim 1, wherein said high-lubricity sliding material is a material containing a lubricative oil.

8. The sliding part assembly according to claim 2, wherein the seal dam area formed from said high-lubricity sliding material is formed integrally with said stationary ring or said rotating ring.

9. The sliding part assembly according to claim 3, wherein the seal dam area formed from said high-lubricity sliding material is formed integrally with said stationary ring or said rotating ring.

10. The sliding part assembly according to claim 2, wherein the seal dam area formed from said high-lubricity sliding material is formed separately from said stationary ring or said rotating ring, and is integrated therewith by bonding.

11. The sliding part assembly according to claim 3, wherein the seal dam area formed from said high-lubricity sliding material is formed separately from said stationary ring or said rotating ring, and is integrated therewith by bonding.

12. The sliding part assembly according to claim 2, wherein said high-lubricity sliding material is a material containing a solid lubricant selected from the group consisting of PTFE, MoS2, WS2, graphite and BN.

13. The sliding part assembly according to claim 3, wherein said high-lubricity sliding material is a material containing a solid lubricant selected from the group consisting of PTFE, MoS2, WS2, graphite and BN.

14. The sliding part assembly according to claim 4, wherein said high-lubricity sliding material is a material containing a solid lubricant selected from the group consisting of PTFE, MoS2, WS2, graphite and BN.

15. The sliding part assembly according to claim 5, wherein said high-lubricity sliding material is a material containing a solid lubricant selected from the group consisting of PTFE, MoS2, WS2, graphite and BN.

16. The sliding part assembly according to claim 2, wherein said high-lubricity sliding material is a material containing a lubricative oil.

17. The sliding part assembly according to claim 3, wherein said high-lubricity sliding material is a material containing a lubricative oil.

18. The sliding part assembly according to claim 4, wherein said high-lubricity sliding material is a material containing a lubricative oil.

19. The sliding part assembly according to claim 5, wherein said high-lubricity sliding material is a material containing a lubricative oil.

* * * * *